United States Patent [19]
Golden

[11] 3,943,290
[45] Mar. 9, 1976

[54] SEMI-AUTOMATIC TELEPHONE-ANSWERING SYSTEM

[76] Inventor: Michael E. Golden, 14028 W. Tahiti Way, P43, Marina del Ray, Calif. 90291

[22] Filed: Jan. 9, 1974

[21] Appl. No.: 432,106

[52] U.S. Cl. ............................................. 179/6 C
[51] Int. Cl.² ........................................... H04M 1/64
[58] Field of Search ............ 179/6 R, 6 C, 100.1 PS, 179/1 B, 27 B, 27 D

[56] References Cited
UNITED STATES PATENTS

| | | | |
|---|---|---|---|
| 2,864,895 | 12/1958 | Bryant, Jr. | 179/6 C |
| 3,246,082 | 4/1966 | Levy | 179/1 B |
| 3,590,159 | 6/1971 | Meri | 179/6 R |
| 3,601,556 | 8/1971 | Cooper, Jr. | 179/100.1 PS |
| 3,752,936 | 8/1973 | Morse | 179/27 D |
| 3,780,227 | 12/1973 | Pirnie, Jr. et al. | 179/6 C |

*Primary Examiner*—Vincent P. Canney
*Attorney, Agent, or Firm*—Nilsson, Robbins, Bissell Dalgarn & Berliner

[57] ABSTRACT

A semi-automatic telephone-answering system which connects a voice message to an incoming telephone line upon being activated. The incoming telephone line is connected to the system by an operator switchboard jack or key connector on a multiline telephone. A cueing signal switches a prerecorded message from a source thereof to the incoming telephone line at the beginning of the message. The cueing signal is synchronized with the message source so that switching means can only be activated at the beginning of the message. At the end of the message, a second cueing signal connects a music source or channel to the incoming telephone line. A primary signal indicates that the incoming telephone line has been waiting to be answered by the live operator for a predetermined time. A secondary signal is provided to indicate to the operator that a waiting call is being or has been answered live of a remote location. Thus, an effective urgency is imparted to the live operator as to the more pressing calls. The primary signal can also be transmitted to supervisory personnel to indicate that an overload condition exists in the answering system and allows said supervisor to intervene in calls or to talk on telephone lines, from a remote location, which an operator cannot answer because she is busy with other lines.

11 Claims, 4 Drawing Figures

SEMI-AUTOMATIC TELEPHONE-ANSWERING SYSTEM

BACKGROUND OF THE INVENTION

1. Field of the Invention

The field of art to which the invention pertains includes the field of automatic and semi-automatic telephone-answering systems, particularly, with respect to a system for providing a voice message upon being activated and subsequent to the voice message, entertainment, such as music can be provided.

2. Description of the Prior Art

Conventional telephone-answering systems are designed to provide a message for the caller when a plurality of incoming calls are simultaneously received and all the calls cannot be answered at the same time. The message indicates that the system is overloaded and that the caller will be answered if he will wait on the line. Typically, these systems provide prerecorded messages which can come on the line in the middle of the message thus constituting an annoyance to the caller, or require the expensive alternative of many separate tape players or other sound sources so that one is available for each line which may be answered or they require that a line ring an unacceptable number of times before the line is answered while waiting for the message to come to its beginning. With the first approach, subsequent to the message, a long period of time may elapse before the caller is attended to by the live operator. This period of silence can be an annoyance to the caller, thereby resulting in irritation or further lack of pursuit of the call. Unless extremely sophisticated storage equipment is provided, the operator cannot determine which call has been waiting the longest time and is unable to take the incoming calls in sequence.

The present invention provides an automatic telephone-answering system utilizing a single sound source for a large plurality of telephone lines which commences a voice message at the beginning of the message, or any line to which the system is connected with a minimal delay before start of the message, and subsequent to the voice message provides entertainment, such as music, until the live operator is available to service the caller. A primary signal indicator provides information to the operator as to which calls have been waiting. A secondary signal indicator indicates when the caller has waited an inordinate period of time. This information can also be transmitted to supervisory personnel so that they may aid the operator in answering the calls when a large number of callers have been waiting.

SUMMARY OF THE INVENTION

A telephone-answering system includes a connector for manually or automatically coupling an incoming telephone line to the system after a predetermined number of rings. Cueing means are provided for coupling a prerecorded message to the incoming telephone line. A cueing signal precedes the message for activating a switch device connected to the incoming telephone line. Once activated, the message is coupled to the incoming telephone line only at the beginning of the message. Additional means for limiting the time delay from connection to the start of the message to a fraction of the message length is also provided.

DESCRIPTION OF THE PREFERRED EMBODIMENT

Figure 1:
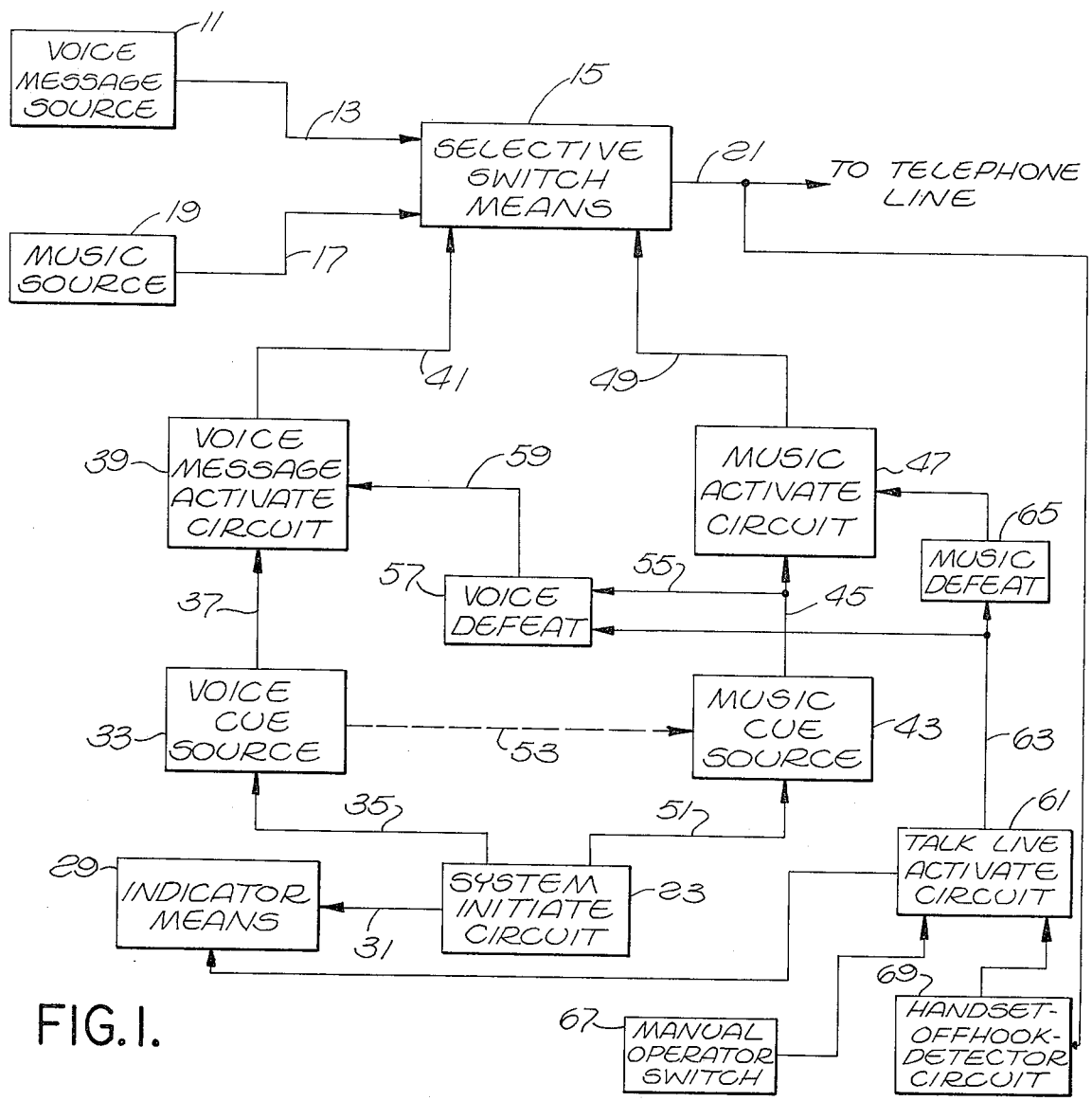
FIG. 1 is a schematic diagram in block form illustrative of the circuit functions of the telephone-answering system in accordance with the present invention.

Referring now more particularly to FIG. 1, there is shown a voice message source 11 which is connected by way of lead 13 to a selective switch means 15. Also connected to the selective switch means by way of lead 17 is a music source 19. The selective switch means 15 is connected by way of the lead 21 to the telephone line to thereby provide to a caller either a voice message or source of entertainment such as music in the event the caller has received service by way of the automatic answering system. To activate the selective switch means 15, there is provided a system-initiate circuit 23 which is activated upon a live operator receiving the caller's ring and thereupon plugging into the jack on the telephone system which she is attending a cord from the automatic answering system as herein disclosed. The system may also be connected to the telephone line by means of a ring-counting relay after a predetermined number of rings. The system-initiate circuit activates an indicator means 29 by way of the lead 31 and simultaneously activates a voice cue source 33 by way of the line 35. The voice cue source provides a cue signal by way of the lead 37 to the voice message-activate circuit 39 which in turn by way of the lead 41 places the selective switch means 15 into such a position that a voice message will be provided from the voice message source only at the beginning of the message to the caller by way of the line 21. Thus, the caller will now be informed for example that his call is being answered electronically since the operator is busy otherwise and that if he will please wait a few moments, the operator will then be with him. To make any waiting time more pleasant to the caller, a music source is then provided but the music does not enter until the voice message is completed. Thus, a music cue source 43 provides a music cue over the lead 45 to the music-activate circuit which in turn by way of the lead 49 causes the selective switch means 15 to provide music from the source 19 to the lead 21.

The music cue source 43 may be activated in various ways. For example, upon the system-initiate circuit being activated, a signal may be applied by way of the lead 51 to the music cue source. The music cue source may then have a built-in delay to provide time for a message to be provided from the voice message source before it provides a music cue source. Alternatively, there may be a connection as shown by the dashed line 53 from the voice cue source to cause the music cue source to be mechanically or electronically synchronized with respect thereto.

To preclude the possibility of music and voice being on the line to the caller simultaneously, the music cue source is also provided by way of the lead 55 to a voice defeat 57. A signal from the voice defeat circuit 57 is provided by way of the line 59 to the voice message-activate circuit, thereby de-activating the circuit and causing the selective switch means to become open insofar as any audio from the voice message source 11 is concerned.

From this general block diagram, it can thus be seen that upon the operator activating the system in accordance with the present invention, a voice cue is provided which activates a selective switch means thereby providing a voice message to the caller only at the beginning of the voice message. When the voice message is ended, the system automatically switches from that voice message source to a music source thereby providing a pleasing interlude during which the caller waits for the live operator to service his incoming call. To provide information to the operator as to which customer is waiting, the indicator means 29 is provided and is activated as is indicated when the entire system is placed into operation upon the operator receiving the incoming call and activating the system.

After the system has automatically answered the caller's ring, the audio or music must be automatically disconnected to preclude the necessity of talking over the same. Thus, there is provided a talk live activate circuit 61 which provides a signal by way of lead 63 to the voice-defeat 57 and a music-defeat 65. A signal is also applied to the indicator means 29. Each of the defeat circuits automatically deactivate the respective voice or music circuit connected to the telephone line through the selective switch means 15. The talk live activate circuit 61 is activated by either the operator manually plugging into the circuit to talk live as illustrated by the manual operator switch 67 or by a subscriber picking up a remote phone to answer the call which is illustrated by the handset-offhook-detector circuit 69.

The cueing means can be generated either directly from the sound source by detecting physical or optical signals attached thereto, or by detecting a tone or a silent period between each repetition of the message; or cues may be generated by separate timing circuits or mechanisms synchronized to the sound source or its carrier.

Figure 2:
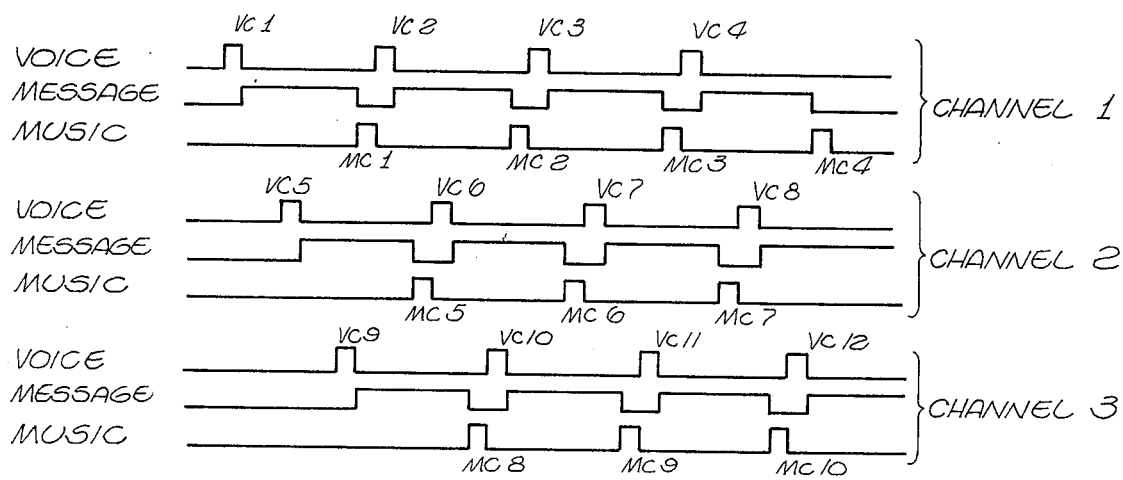
FIG. 2 is a timing diagram showing the relationship between the voice cues and music cues on a multichannel recording medium.

One means of obtaining the appropriate synchronization between the voice and message cues is shown in FIG. 2. As is therein shown, there are three channels, channel 1, channel 2, and channel 3 recorded upon a single recording medium such as a magnetic tape or the like. In channel 1, there is illustrated a series of voice cues VC1-VC4. The same repetitive voice message would be recorded between each of the cues commencing immediately following each of the cues. It is to be presumed that the recording medium when being played moves toward the left across the playback heads thus causing VC1 to be reproduced before any of the other signals. As is also shown, there is recorded in channel 1 music cues MC1-MC4. It should be noted that the music cues immediately follow the end of the recorded audio message and thus fall just preceding the next voice cue thus music cue MC1 immediately precedes voice cue VC2 or alternatively it may be viewed as falling at the conclusion of the time after VC1 during which the recorded audio message is reproduced assuming the system is activated.

To preclude the possiblity of a caller calling in immediately after the occurence of VC1 and having a long silent period of ten to fifteen seconds which has been determined to be exceedingly annoying to the caller, an additional set of voice and music cues is provided in channel 2. As is therein shown, voice cues VC5-VC8 are staggered from voice cues VC1-VC4 in such a way that VC5 occurs approximately one-third of the time between VC1 to VC2. Likewise, the music cues MC5-MC7 are staggered from music cues MC1-MC4 but are placed in relationship to the respective voice cues as was above described.

A similar arrangement is provided in channel 3 but with the cues staggered approximately two-thirds of the way between VC1 and VC2.

Thus, with this type of arrangement and synchronization between the voice and music cues, it can be seen that any time a caller is placed into this system, a voice cue occurs within a very short period of time much less than the duration of the entire voice message while at the same time causing a voice message to occur and be provided to the listener only at the beginning thereof.

Figure 3:
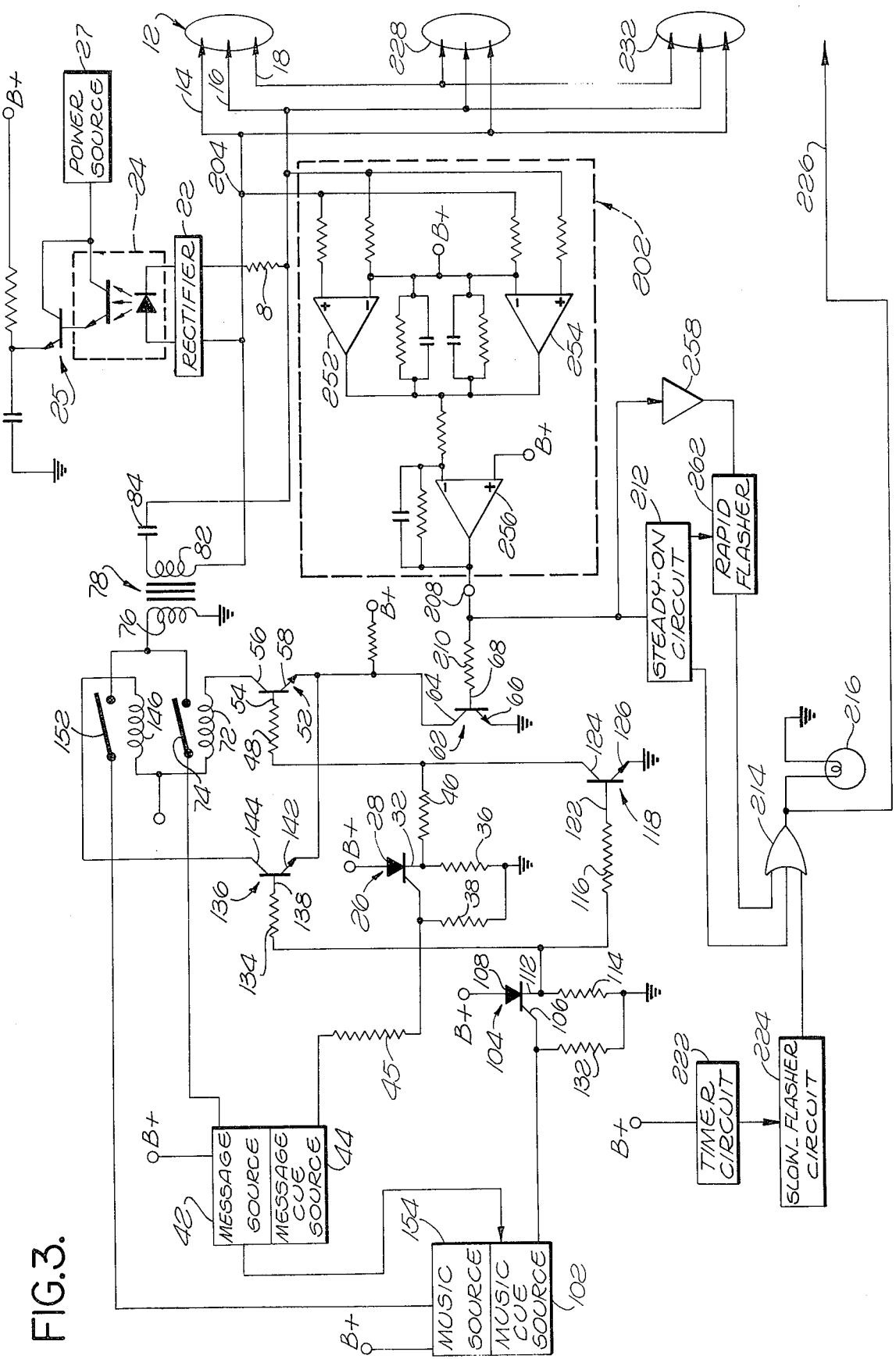
FIG. 3 is a schematic circuit diagram in more detail illustrative of one embodiment of a telephone-answering system constructed in accordance with the present invention.

Referring now more particularly to FIG. 3, there is shown in more detail a schematic illustration of one embodiment of the semi-automatic telephone-answering system constructed in accordance with the principles of the invention. The system as herein illustrated includes a jack or key connector 12 which is plugged into a standard PBX telephone switchboard. The jack or key connector 12 is illustrated as a three-wire line containing a plug tip 14, a plug ring line 16, and a plug sleeve 18. When a ringing telephone line is answered by inserting the cord plug connector 12 into the appropriate jack, the telephone line battery voltage appearing across the plug tip 14, and plug ring line 16 is applied to a rectifier 22 through the line-seizing resistor 8 causing the line to be answered. The rectifier 22 activates a switch means 24. As shown, the switch means 24 comprises a light-emitting diode and photo-transistor which when conducting saturates power transistor 25 which in turn connects power from the source 27 thereof to the $B^+$ terminal for use by the entire circuit. Thus, the $B^+$ is connected to a first silicon-controlled rectifier (SCR) 26 at its anode 28. The first SCR 26 further comprises a cathode 32 and a gate 34. The cathode 32 is connected through a current limiting resistor 36 to a ground potential. The gate 34 is connected through a reference resistor 38 to ground potential.

Activation of the switch means 24 also activates a message source 42 and a message cue 44. The message source 42 is typically a short-duration message of approximately 3 to 4 seconds which can be recorded once or repeatedly on a continuous loop disc or drum-type recording medium. The preferred embodiment is a plurality of repeated messages, typically of 20 minutes playing duration. Each prerecorded message is preceded and synchronized with an appropriate message cue such as an audible tone, a silent period of fixed duration, a foil strip, a reflective spot, or the like. Normally the message cue is kept off the telephone line if audible and thus is not heard by the caller. At the conclusion of the cue, an electrical signal is coupled from the message cue 44 through a series resistor 45 to the gate 34 of the first SCR 26 causing the SCR 26 to become conductive.

The cathode 32 of the SCR 26 is also connected through a resistor 46 to an input resistor 48 of a message-switching transistor 52 at its base 54. The message-switching transistor 52 further comprises a collector 56 and an emitter 58. The emitter 58 of the message-switching transistor 52 is connected to a normally conductive transistor 62 at its collector 64. The transistor 62 further comprises an emitter 66 which is connected to ground, and a base 68.

A message-switching relay 72 is connected from the collector 56 of the transistor 52 to the source of positive reference potential B$^+$. When the first SCR 26 fires, the transistor 52 becomes conductive and activates the relay 72 closing a contact 74. The contact 74 connects the message source 42 across the primary coil 76 of a transformer 78. The secondary 82 of the transformer 78 is connected through a DC (direct-current) blocking capacitor 84 across the plug tip 14 and the plug ring line 16 of the telephone jack. The prerecorded message is thus transmitted over the telephone line to the caller informing him that the switchboard is overloaded at the moment and that if he will wait for a few seconds he will be attended to shortly. The message source is not connected across the line until the synchronized message cue activates the SCR 26 and the message thus commences at its beginning.

At the termination of the message, a music cue signal from a music cue source 102 is coupled to a second SCR 104 at its gate 106 to cause it to become conducting. The SCR 104 comprises an anode 108 which is connected to B$^+$ by the activation of the switch means 24. The second SCR 104 further comprises a cathode 112 which is connected through a current-limiting resistor 114 to ground and through a resistor 116 to a message-defeat transistor 118 at its base 122. The message-defeat transistor 118 further comprises a collector 124 which is connected to the junction of the resistors 46 and 48 and an emitter 126 which is connected to ground. The music cue signal from the source 102 is coupled across an input resistor 132 connected between the gate 106 of the second SCR and ground.

The cathode 112 of the SCR 104 is connected through a resistor 134 to a music-switching transistor 136 at its base 138. The music-switching transistor 136 further comprises an emitter 142 which is connected to the collector 64 of the normally conductive transistor 62. The collector 144 of the music switching transistor 136 is connected through a relay 146 to the source of positive reference potential B$^+$.

When the second SCR 104 becomes conductive, the message-defeat transistor 118 becomes conductive thereby effectively connecting the base of the message-switching transistor 52 to ground causing it to become conductive, thereby deactivating relay 72 and disconnecting the contact 74 from the message source 42. Simultaneously, transistor 136 conducts and relay 146 causes a contact 152 to be connected between a music source 154 and the primary 76 of the transformer 78, thereby providing the caller with prerecorded music for his pleasure and diversion until the live operator can answer his call.

It should be remembered that the voice message may be recorded on several channels of the same sound medium in staggered relationship along with a channel providing a continuous source of music. That is, the voice message on the second channel of the medium starts a predetermined time after the voice message on the first channel, for example one and one-half seconds. A similar delay may be imparted to the start of the voice message on the third channel. Thus, there will never be a silence on the line, after the ring is answered and before a message starts, of a duration annoying to the caller. Obviously, the music cues and music are synchronized with each of the voice messages to immediately follow the same.

A differential amplifier circuit 202 has its input terminals 204 and 206 connected to the plug tip 14 and plug ring line 16, respectively. The differential amplifier circuit 202 which will be described in greater detail hereinafter, is used to detect voltage rises and drops across the plug tip 14 and plug ring line 16. The output terminal 208 of the circuit 202 is connected through a resistor 210 to the base 68 of the normally conductive transistor 62. When the system as described is in its normal hold operating condition and a caller is on the line, the signal at the output terminal 208 is sufficient to cause the transistor 62 to remain in its normally conductive state.

The activation of switch means 24 connects the source of positive reference potential B$^+$ to a timer circuit 222. The timer circuit 222 is thus initiated once the call has been intercepted. After the caller has been listening to the music from the music source 154 for a predetermined interval of time, such as 25 seconds, for example, the timer circuit activates a slow flasher circuit 224. The slow flasher circuit 224 is connected through a gate 214 to a switchboard lamp 216. The lamp 216 switches from an off condition to a slow flashing condition and indicates to the operator that the caller has been waiting for an inordinate period of time, i.e., at least 25 seconds. The output of the gate circuit can also be connected through a line 226 to a supervisor console (not shown) so that should the operator at the switchboard be overloaded, the supervisor can assist the operator.

The plug tip 14, the plug ring line 16 and the plug sleeve 18 can also be coupled through a connector 228 to the supervisor's console. Additionally, other jacks such as 232 can be coupled across the plug tip 14, plug ring 16 and plug sleeve 18 by means of a connector 232 so that the input lines can be connected to other switchboards when needed.

Should the supervisor or person at a remote location pick up the incoming call, the voltage across the plug tip 14 and plug ring 16 will drop as a result of connecting an additional instrument across the telephone line. This voltage drop across the lines of the plug tip and plug ring circuit is sensed at the input terminals of the differential amplifier circuit 202. The differential amplifier circuit 202 comprises a pair of operational amplifiers 252 and 254 whose output is coupled to an output operational amplifier 256. The voltage drop causes the voltage at the output terminal 208 of the differential amplifier circuit 202 to drop causing the normally conductive transistor 62 to become nonconductive. With the transistor 62 nonconductive, the transistor 136 becomes non-conducting, unlatching the music relay 146 and disconnecting the music source from the primary 76 of the transformer 78. The caller can now speak to the operator without music on the line. Additionally, it should be noted that the emitter 58 of the message switching transistor 52 is also connected to the collector 64 of transistor 62 and should the call be answered when the system is in the message mode, the message will also be disconnected and the operator can speak to the caller.

The voltage drop at terminal 208 is also utilized to activate a steady-on circuit 212 which is connected through the gate 214 to the lamp 216. The lamp 216 enters a steady-on mode and indicates to the operator that someone else has answered the call.

Should the supervisor then hang up the remote instrument, the voltage at the plug tip 14 and plug ring 16 will rise causing the output voltage terminal 208 to rise and a threshold circuit 258 connected to the terminal 208 is activated. The output of the threshold circuit 258 is connected to a rapid flasher 262 whose output is connected to the gate 214. The rapid flasher 258 which is latched into a preset condition by the steady-on circuit 212 activates the lamp 216 which will start flashing rapidly indicating to the operator that the supervisor has finished servicing the call. The operator may then disconnect the jack or key connector 12 from the telephone line thus terminating contact with the caller.

Figure 4:
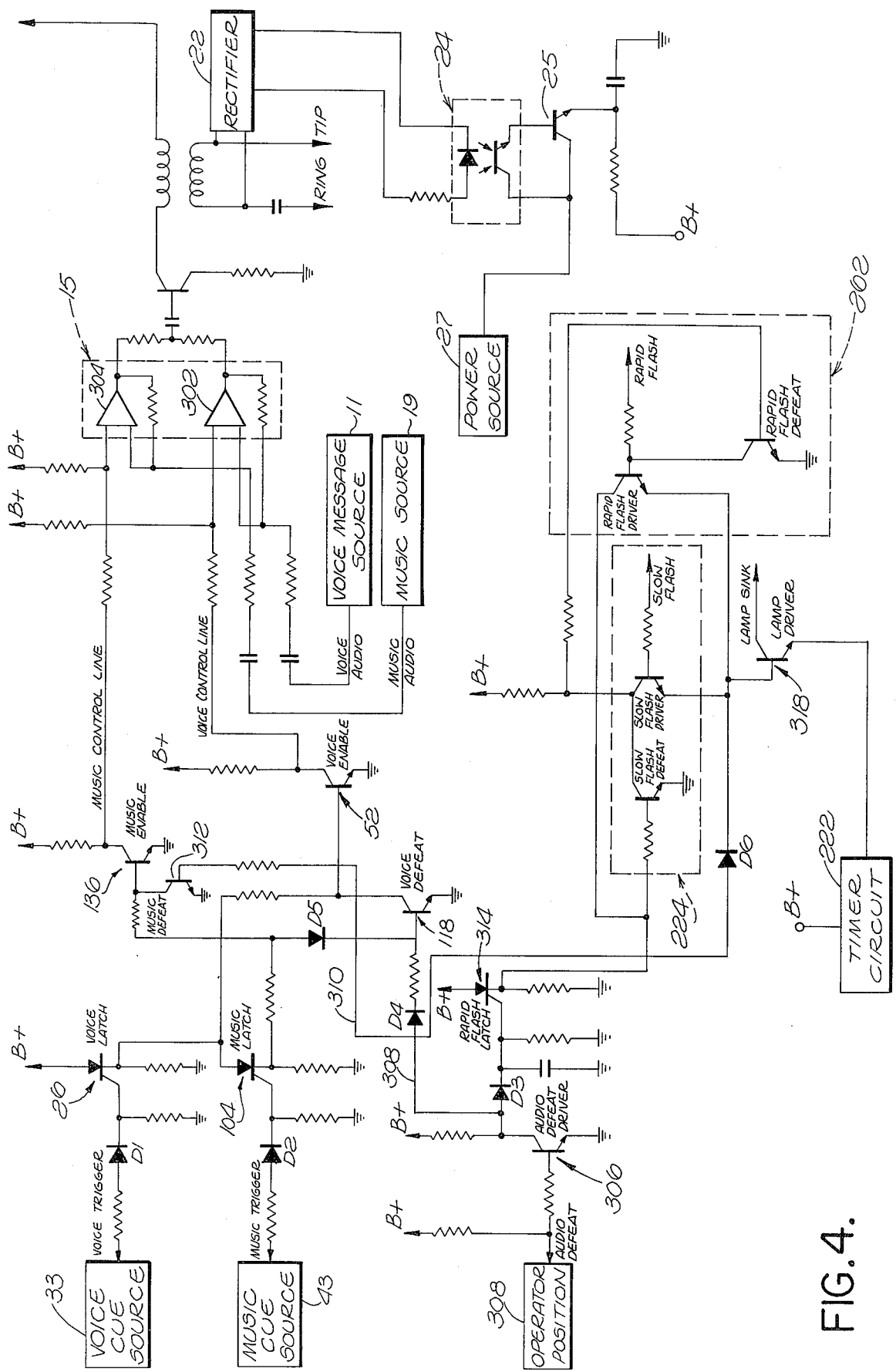
FIG. 4 is a schematic circuit diagram of another embodiment of a telephone-answering system in accordance with the present invention.

Referring now more particularly to FIG. 4, there is illustrated in detailed schematic diagram another and more preferred embodiment of the system constructed in accordance with the present invention, where various portions thereof are the same as illustrated in FIG. 3 and as a result, the same numbers have been utilized to indicate similar components or elements. Since there are substantial similarities, no detailed description of the circuit as shown in FIG. 4 will be given except in conjunction with a general discussion of the operation of the circuit.

As above indicated, when the operator activates the system, power is applied to the particular circuit chosen. It will be understood by those skilled in the art that there is a separate circuit for each cord that may be used by the live operator for answering automatically incoming calls during a busy period. It is only upon activation of a specific circuit such as that shown in FIGS. 1, 3 or 4 that power is applied to the particular circuit. That circuit then remains active until the telephone is answered by the operator (or someone else connected in parallel with the operator system).

Thus, upon activation of the system as above described, a voice cue from the source 33 is applied through a blocking diode D1 to the voice latch SCR 26, which in turn causes the voice-enable transistor 52 to become conductive which in turn activates the amplifier 302 in the selective switch means 15. It will be noted that the voice message source 11 is connected to a terminal of the amplifier 302. Thus, upon being activated by causing the transistor 52 to become conductive, the voice message from the source 11 is applied to the telephone line and received by the caller.

Upon conclusion of the voice message, the music cue source 43 provides a music cue through the blocking diode D2 to the music latch SCR 104 which simultaneously causes the music-enable transistor 136 to become conductive thereby causing the amplifier 304 to become conductive. The amplifier 304 has connected to another terminal thereof music from the source thereof 19 and thus upon being made active, supplies music to the caller. Simultaneously, with causing transistor 136 to become conductive, transistor 118 is also caused to become conductive thereby connecting the base of the voice-enable transistor to ground and causing it to become non-conductive thereby rendering the amplifier 302 inoperative and removing voice from the telephone line.

When the operator then answers the call of the caller as above pointed out, it is desirous to remove all music and/or voice from the line. Thus, there is provided an audio-defeat driver transistor 306 which becomes conductive upon the provision of a signal from the operator's position 308 indicative of the operator's having answered the caller in a live manner. The output signal generated by the audio-defeat driver 306 is provided by way of the lead 308 and the blocking diode D4 to the base of the voice-defeat transistor 118 thereby causing it to become conductive if $B^+$ is applied to the collector thereof. Simultaneously, the signal is also applied by way of the lead 308 and the lead 310 to the base of the music-defeat transistor 312, causing it to become conductive. The music-defeat transistor 312 becoming conductive causes the music-enable transistor 136 to become non-conductive thereby rendering the amplifier 304 non-conductive and removing the music from the line. Thus, it can be seen that the transistor 306 automatically deactivates both the music and the voice lines connected to the caller's incoming telephone line by way of the system.

It will also be noted that the output signal from the transistor 306 is connected by way of the blocking diode D3 to the rapid flash latch illustrated as an SCR 314 which in turn provides operating potential to a rapid flash driver transistor 316 thereby causing the lamp driver transistor 318 to flash rapidly indicating that the call has now been answered as above described. Prior thereto, the lamp will have been in an off or a steady state or a slow flash condition depending upon the period of time during which the caller has been waiting on the line subsequent to the automatic answering system being activated.

There has thus been disclosed a system for answering telephones automatically after their first being activated by an operator who is too busy to service the call at the moment it comes in. This system provides a voice message only at the beginning of the voice message and upon conclusion of the voice message then automatically provides music or the like all from a single multichannel sound source until the call can be serviced by the operator in a live manner. In the meantime, the operator is provided an indicating signal of the urgency of the call on a time-lapse basis.

I claim:

1. A semi-automatic telephone answering system comprising:
    a source of pre-recorded voice messages each preceeded by a pre-recorded cue signal;
    a source of pre-recorded entertainment;
    selective switch means coupled between a telephone line and said source of pre-recorded voice messages and entertainment;
    operator activated answering system initiate means for manually setting said system in operation, said system thereafter operating automatically;
    voice cue signal generating means connected to said system initiate means for generating a voice cue signal responsive to said pre-recorded cue signal;
    voice message activate means connected to said voice cue generating means to receive said voice cue signal; and
    means connecting said voice message activate means to said selective switch means, said selective switch means automatically connecting said voice message source to said line only in response to said voice cue signal whereby a pre-recorded voice message appears on said line only at the beginning of said message.

2. A telephone-answering system in accordance with claim 1 wherein said pre-recorded voice message and cueing signals are recorded on a continuous medium and are repeated a plurality of times on said medium.

3. A telephone-answering system in accordance with claim 1 further comprising entertainment cueing means for deactivating said source of pre-recorded messages at the end of a message and automatically connecting an entertainment source to said incoming telephone line at the end of said message.

4. A telephone-answering system in accordance with claim 3 further including a recording medium, said cueing signals, said pre-recorded voice message and said pre-recorded entertainment all being carried by said recording medium.

5. A telephone-answering system in accordance with claim 3 and further comprising a primary signal means connected to said system initiate means for indicating an incoming telephone line has been answered with the semiautomatic system and is waiting to be answered by a live attendant.

6. A telephone-answering system in accordance with claim 5 further comprising secondary signal means connected to said primary signal means and activated by a timer for indicating that said primary signal means has been in an indicating position for a predetermined interval of time.

7. A telephone-answering system in accordance with claim 6 wherein said secondary signal means provides an indication to a second location for indicating to supervisory personnel that an overload condition exists.

8. A telephone-answering system in accordance with claim 1 further comprising voltage level detector circuit means connected across said telephone line for indicating a voltage change across said incoming telephone line and providing an output signal representative of the voltage level on said telephone line.

9. A telephone-answering system in accordance with claim 8 wherein a voltage drop is indicative of said incoming telephone line being answered at a remote location, the output signal of said circuit means producing an output control signal, means coupling said control signal to said voice and entertainment circuits for disconnecting intelligence from being transmitted to said line through said system.

10. A telephone-answering system in accordance with claim 8 wherein a voltage rise is indicative of a caller disconnecting himself from said incoming telephone line of said system and said output signal is produced responsive thereto, means connecting said output signal to an indicator means signaling said caller disconnect.

11. A telephone-answering system in accordance with claim 1 which further includes detector means for determining when said telephone line has been connected to a live attendant and defeat signal-generating means to deactivate said pre-recorded message and said entertainment.

* * * * *